United States Patent [19]

Kagohata et al.

[11] Patent Number: 4,649,709
[45] Date of Patent: Mar. 17, 1987

[54] TEMPERATURE CONTROL METHOD AND APPARATUS FOR AIR CONDITIONER

[75] Inventors: Tsuneo Kagohata, Naka; Kenichi Chonan, Katsuta; Atsushi Suginuma, Mito; Akira Tezuka; Hideo Usui, both of Katsuta, all of Japan

[73] Assignee: Hitachi, Ltd., Tokyo, Japan

[21] Appl. No.: 723,156

[22] Filed: Apr. 15, 1985

[30] Foreign Application Priority Data

Apr. 13, 1984 [JP] Japan ................... 59-72674

[51] Int. Cl.⁴ .............................. F25D 17/06
[52] U.S. Cl. .......................... 62/89; 236/49; 236/78.0; 165/43
[58] Field of Search ............ 62/229, 162, 89; 236/49, 78.0; 165/43

[56] References Cited

U.S. PATENT DOCUMENTS 4,471,632  9/1984  Nishi et al. ................ 62/228.5
4,543,796  10/1985  Han et al. .................. 236/49

FOREIGN PATENT DOCUMENTS 54-104524  8/1979  Japan .
55-31654   3/1980  Japan .
57-70727   5/1982  Japan .
57-130809  8/1982  Japan .
58-81813   5/1983  Japan .

Primary Examiner—William E. Wayner
Attorney, Agent, or Firm—Antonelli, Terry & Wands

[57] ABSTRACT

An air conditioning method for controlling a room temperature by an air conditioner which controls a temperature control element in accordance with a required cooling power in the room. A temperature of chilled air blown out of a chilled air blow-off port of the air conditioner is directly or indirectly monitored, and if the chilled air temperature is lower than a predetermined temperature, the chilled air blown out of the blow-off port is prevented from becoming colder than a predetermined temperature even when the chilled air temperature would become lower than the predetermined temperature if the temperature control in accordance with the required cooling force in the room is applied.

7 Claims, 8 Drawing Figures

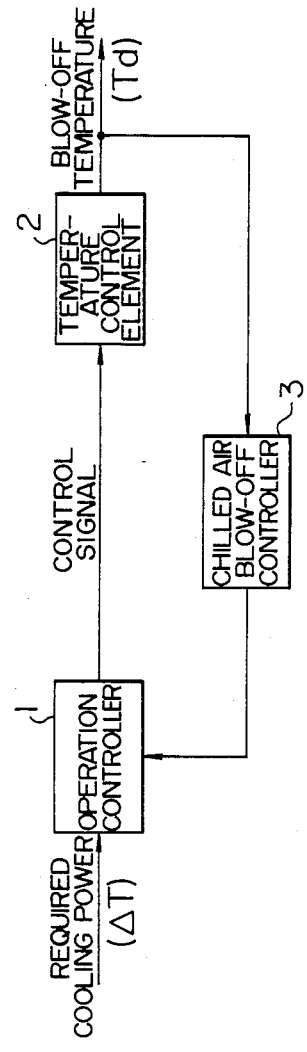
F I G. 1
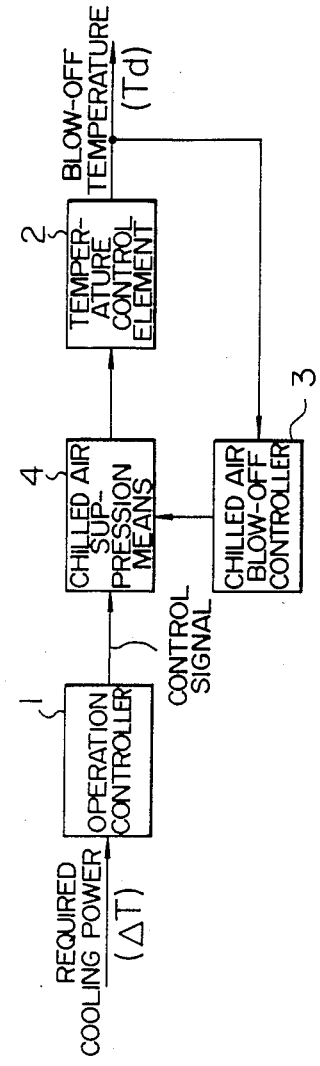
F I G. 2

F I G. 3
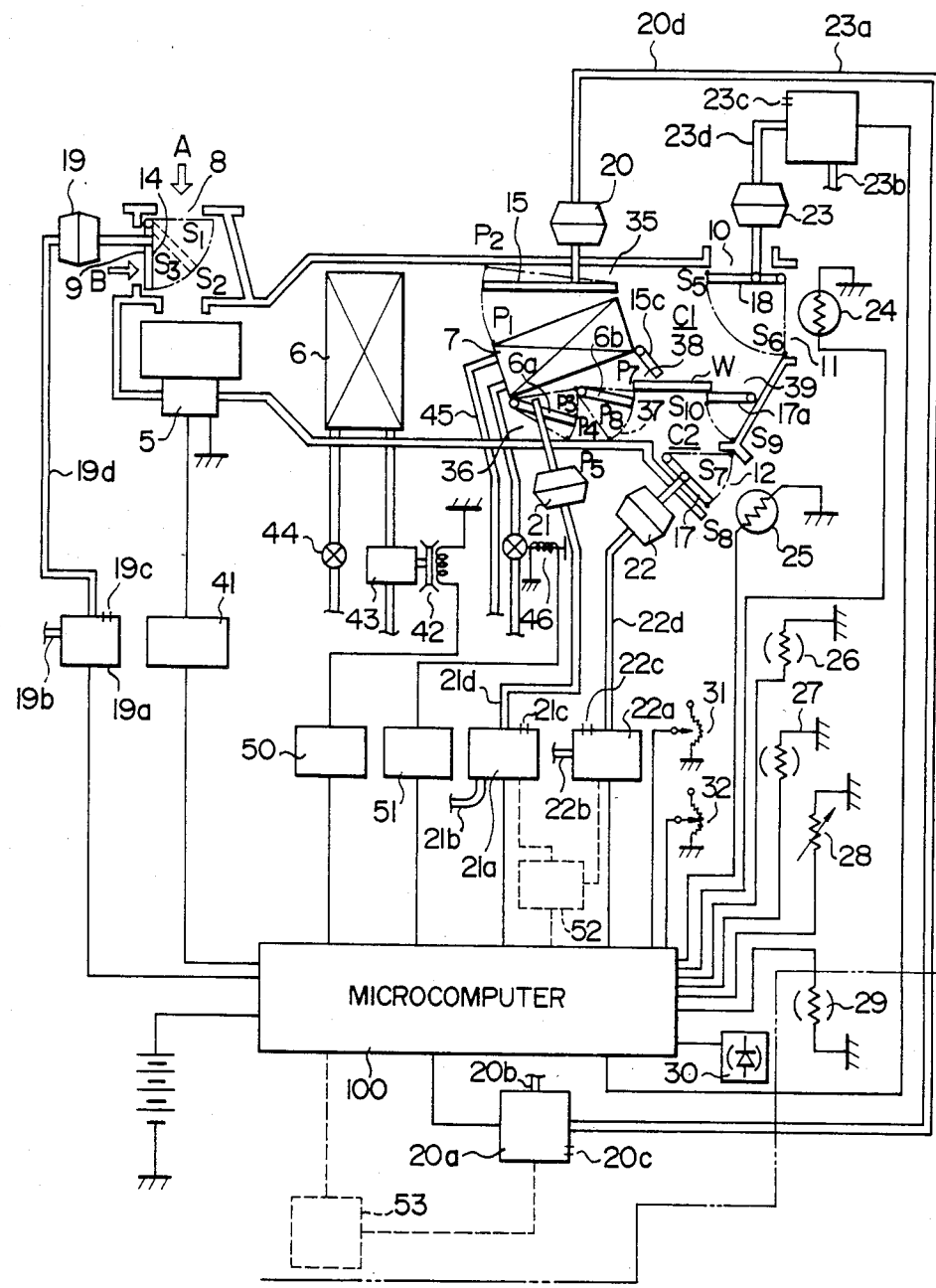

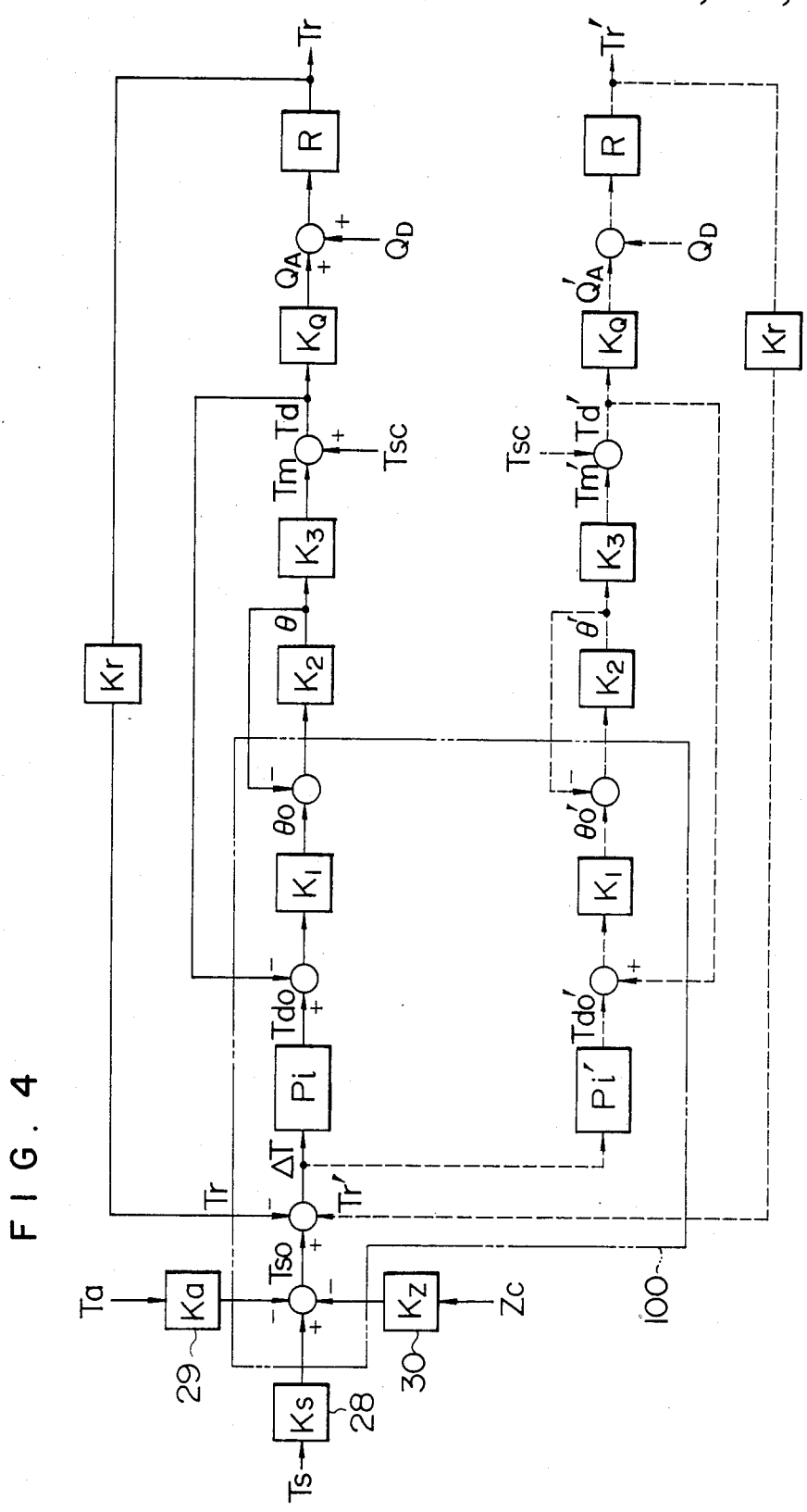
F I G. 4

TEMPERATURE CONTROL METHOD AND APPARATUS FOR AIR CONDITIONER

BACKGROUND OF THE INVENTION

1. Field of the Invention

The present invention relates to temperature control method and apparatus for an air conditioner such as a car air conditioner in which blow-off port of chilled air is arranged in a vicinity of car occupants.

2. Description of the Prior Art

In the air conditioner of this type, as shown in Japanese Patent Laid-Open Publications Nos. 130809/82 and 81813/83, a cooling power required in a room is indirectly calculated from a physical quantity based on a difference between a preset temperature and an actual room temperature, and an opening angle of an air mix door, a flow rate of a blower, a quantity of hot water supplied to a heater core and an operation/stop time of a compressor are controlled in accordance with a control signal corresponding to the required cooling power to control a supplying cooling power and hence the room temperature.

When the room temperature approaches the preset temperature and the required cooling power is reduced, the compressor is continuously operated, the quantity of the hot water to the heater core is zero (or the air mix door is in a position (full cool position) to block flow-in of chilled air to the heater core) and the flow rate of the blower is minimum.

In this case, since a quantity of suction air which passes through an evaporator is low, the quantity of chilled air blown out of the blow-off port is small but the temperature thereof is very low, for example, 5° C. or lower.

If such low temperature air is blown for a long time, the air condition effect in the room is good but a room occupant who sits near the blow-off port feels pain or headache due to overcooling of a portion of his/her body to which the chilled air is directed.

SUMMARY OF THE INVENTION

It is an object of the present invention to provide temperature control method and apparatus for an air conditioner, which prevents too chilled air from being blown out of a blow-off port.

In the temperature control method of the present invention, a room temperature is controlled by an air conditioner which controls a temperature control element in accordance with a required cooling power of the room so that a temperature of chilled air blown out of a chilled air blow-off port of the air conditioner is directly or indirectly monitored, and when the chilled air temperature is lower than a predetermined temperature, the chilled air blown out of the blow-off port is prevented from becoming cooler than the preset temperature, and even when the chilled air temperature from the blow-off port becomes lower than the preset temperature if the temperature control is carried out on the basis of the required cooling power of the room, the blow of the chilled air whose temperature is below the preset temperature is suppressed.

The temperature control apparatus of the present invention comprises means for generating a control signal representative of a required cooling power of the room, at least one temperature control element for controlling a room temperature in accordance with the control signal, chilled air temperature detection means for directly or indirectly detecting a temperature of the chilled air blown out of the air conditioner to the room, compare means for comparing the chilled air temperature detected by the detection means with a preset temperature and producing an output if the chilled air temperature is lower than the preset temperature, and chilled air blow-out control means for suppressing the blow-out of the chilled air whose temperature is below the preset temperature in response to the output from the compare means. Thereby, blowing out of such chilled air is suppressed.

In accordance with the present invention, the room temperature is controlled while the chilled air from the blow-out port is prevented from becoming so cool that an occupant feels pain or headache. Thus, the overcooling in the vicinity of the blow-off port is prevented without sacrifying the cooling effect.

BRIEF DESCRIPTION OF THE DRAWINGS

These and other objects and advantages of the present invention will become apparent by reference to the following description and accompanying drawings, in which:

FIG. 1 is a block diagram of a first group of embodiments of the present invention, FIG. 2 is a block diagram of a second group of embodiments of the present invention, FIG. 3 shows a construction of one embodiment of a car air conditioner in accordance with the present invention, FIG. 4 is a block diagram of a temperature control system in FIG. 1.

DESCRIPTION OF THE PREFERRED EMBODIMENTS

Figure 5:
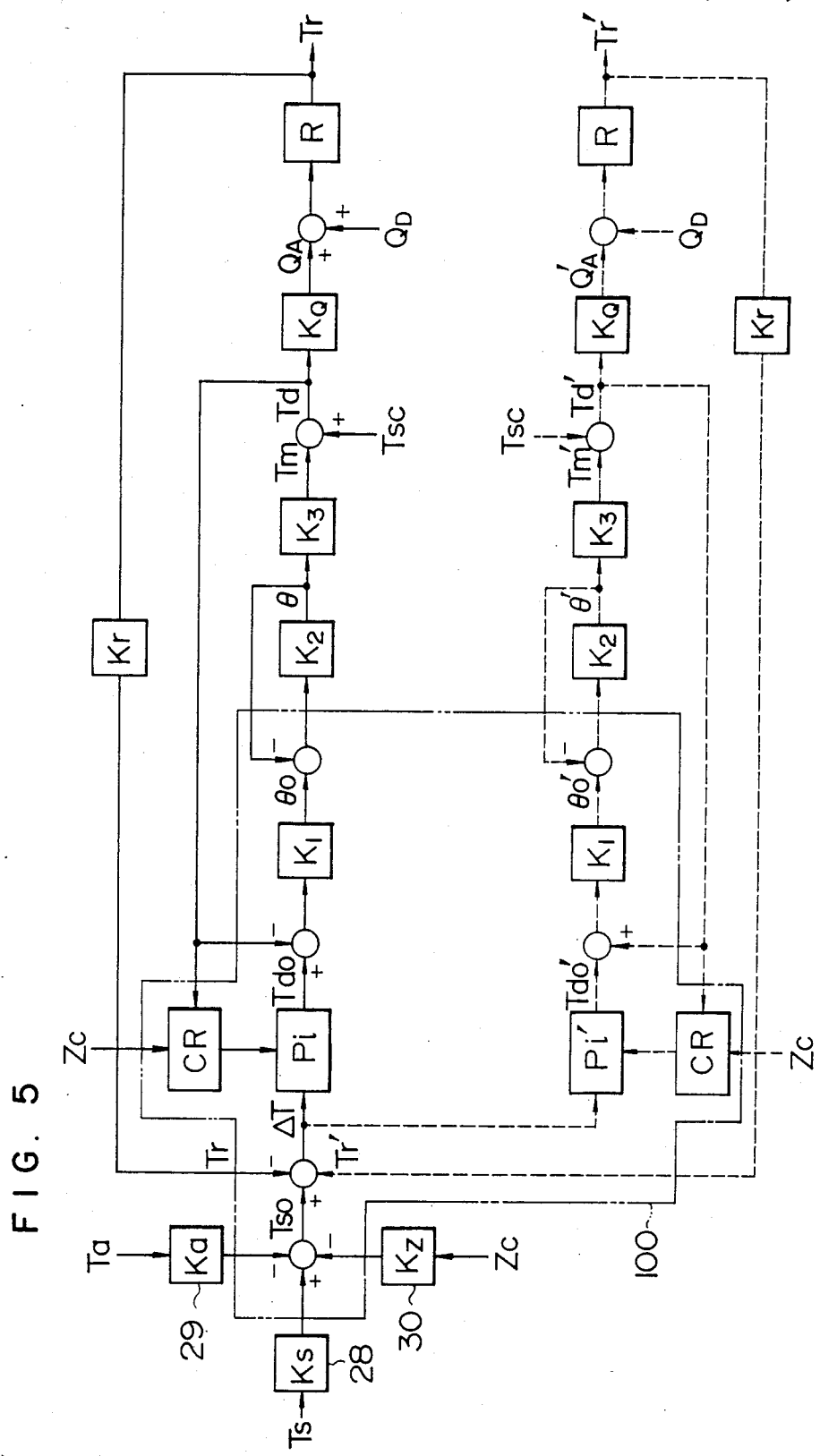
FIG. 5 is a block diagram of a temperature control system which controls a temperature in accordance with a correction by the present invention in the configuration of FIG. 1.

FIG. 1 is a block diagram of a first group of embodiments of the present invention and FIG. 2 is a block diagram of a second group of embodiments.

In FIG. 1, a signal representative of a required cooling power based on a difference $\Delta T$ between an object (preset) temperature $T_{so}$ and a room temperature $T_r$ is supplied from operation means (not shown) to an operation controller 1 which supplies a control signal representative of an object blow-off chilled air temperature $T_{do}$ in accordance with the required cooling power to a temperature control element 2, which controls the blow-out chilled air temperature. The air conditioner takes in air, cools it and blows out the chilled air. Because of a change in the take-in air temperature, an actual temperature $T_d$ usually differs from the object blow-off chilled air temperature $T_{do}$. The blow-off chilled air temperature $T_d$ is directly or indirectly detected and the detected temperature is supplied to chilled air blow-off control means 3 which when it determines that the blow-out temperature is lower than a predetermined temperature, sends a correction signal to the operation controller 1 to change the operation condition of the controller 1.

The object blow-off temperature for the required cooling power may be calculated by proportional integration. In the embodiment of the present invention, the object blow-off temperature $T_{do}$ is obtained as a sum of a value proportional to $\Delta T$ (proportion term) and a value proportional to an integration of $\Delta T$ (integration term), and the integral $\Delta T$ is corrected if the blow-off temperature is lower than the predetermined temperature. The lower the blow-off temperature, the larger the correction or the corrected $\Delta T$ is made and the higher the object blow-off temperature $T_{do}$ is made. In another embodiment of the present invention, when the object blow-off temperature determined by the calculation is lower than a predetermined limit object temperature $T_{do\ min}$, a control signal corresponding to the limit object temperature $T_{do\ min}$ instead of the calculation result is supplied to the temperature control element 2.

In FIG. 2, a signal representative of the required cooling power is supplied to the operation controller 1 from operation means (not shown), and the operation controller 1 calculates the object blow-off temperature $T_{do}$ and supplies a control signal representative of the object blow-off temperature to the temperature control element 2 to control the blow-off temperature. When the blow-off temperature $T_d$ is higher than a predetermined temperature, cooling power controller 4 supplies the control signal from the operation controller 1 to the temperature control element 2 without modifying the control signal. When the blow-off temperature $T_d$ is lower than the predetermined temperature, the chilled air blow-off controller 3 supplies a signal to chilled air suppression means 4 which limits the control signal to suppress the blow-off temperature $T_d$ from becoming lower than the predetermined temperature.

Referring to FIGS. 3 to 6, one embodiment of the present invention applied to a car air conditioner shown in Japanese Patent Laid-Open Publication No. 81813/83 will now be explained.

Air taken in by a blower 5 is cooled by an evaporator 6 and a portion thereof is then heated by a heater core 7 and mixed with cool air bypassed the heater core 7, and the mixed air is blown out from a vent blow-off port 11 or a floor blow-off port 12 into a compartment.

An internal/external air switching door 14 selects whether external air A is to be taken in from an external air introduction port 8 or internal air B is to be taken in from an internal air introduction port 9.

There are two chilled air paths which bypass the heater core 7, that is, a master chilled air path 35 and a slave chilled air path 36. The respective paths have a first air mix door 15 and second air mix doors 16a and 16b respectively arranged therein. A warm air path downstream of the heater core 7 is divided by a wall W into a master warm air path 37 and a slave warm air path 38.

The chilled air passed through the master chilled air path 35 and the warm air passed through the slave warm air path 38 are mixed in a lower chamber C1 and the mixed air is blown out of the vent blow-off port 11 to an upper portion of the compartment, that is, to an upper portion of an occupant's body. On the other hand, the chilled air passed through the slave chilled air path 35 and the warm air passed through the master warm air path 37 are mixed in a lower chamber C2 and the mixed air is blown out of the floor blow-off port 12 to a lower portion of the compartment, that is, to feet of the occupant.

A floor door 17 closes and opens the floor blow off port 12 and is linked to a defroster bypass door 17a arranged in a defroster bypass path 39 to close and open the defroster bypass path 39. A vent door 18 selectively opens the vent blow-off port 11 or opens the defroster blow-off port 10. A warm air bypass control door 15C arranged in the slave warm air path 38 is a flapper door which is opened or closed by a difference between air pressures acting on both sides of the door. The internal/external air switching door 14 is controlled by an actuator 19. The actuator 19 is a well-known double-action type diaphragm actuator which controls introduction of vacuum or introduction of atmosphere into the two diaphragm chambers through a vacuum pipe 19d by an air valve 19a having a vacuum introduction port 19b and an atmosphere introduction port 19C so that it switches the internal/external air switching door 14 to an internal air introduction position $S_1$, semi-internal/external air introduction position $S_2$ or an external air introduction position $S_3$.

The first air mix door 15 may be controlled by an actuator with a built-in air valve shown in Japanese Patent No. 70727/82. In FIG. 1, the actuator 20 and the air valve 20a are separated for the purpose of explanation of functions. By controlling the vacuum introduced into the actuator 20 from the vacuum introduction port 20 through the vacuum pipe 20d and the atmosphere introduced into the actuator 20 from the atmosphere introduction port 20c by the air valve 20a, the opening angle of the first air mix door 15 can be linearly controlled between a maximum cooling position $P_1$ (0 degree) and a maximum warming position $P_2$ (30 degrees). When the first air mix door is set to the maximum cooling position, the air pressure in the upper chamber C1 increases and the warm air bypass control door 15c closes the warm air bypass path. The second air mix door 16a and 16b may be controlled by the actuator having built-in air valve shown in Japanese Patent Laid-Open Publication No. 70727/82, as the first air mix door 15 is done. The doors 16a and 16b are mechanically linked by links and cams so that the door 16b is stopped at a full-close position $P_7$ (0 degree) until the door 16a is moved from a full-close position $P_3$ (0 degree) to a middle-open position $P_4$ (15 degrees), and the door 16b is moved from the full-close position $P_7$ to a full-open position $P_8$ (30 degrees) at a double speed until the door 16a is moved from the middle-open position $P_4$ to a full-open position $P_5$ (30 degrees).

In FIG. 3, the actuator 21 and the air valve 21a are separated for the purpose of explaining the functions. By controlling the vacuum introduced into the actuator 21 from the vacuum introduction port 21b through the vacuum pipe 21d and the atmosphere introduced into the actuator from the atmosphere introduction port 21c by the air valve 21a, the second air mix doors 16a and 16b are linearly position-controlled within the above range.

The vent door 18 is controlled by a well-known single-action type diaphragm actuator. An air valve 23a having a vacuum introduction port 23b and an atmosphere introduction port 23c controls the introduction of vacuum or the introduction of atmosphere into a diaphragm chamber of an actuator 23 through a vacuum pipe 23d to switch the floor door 17 to the position $S_8$ in which the floor blow-off port 8 is opened or the position $S_7$ in which the floor blow-off port 8 is closed.

A microcomputer 100 reads in signals from various sensors such as a vent blow-off temperature sensor which detects a temperature of the air blown out of the vent blow-off port 11, a floor blow-off temperature sensor 25 which detects a temperature of the air blown out of the floor blow-off port 12, a compartment upper temperature sensor 26 which detects a temperature in an upper portion of the compartment, a compartment lower temperature sensor 27 which detects a temperature in a lower portion of the compartment, a sunshine sensor 30 having a temperature setting potentiometer 24, an external temperature sensor 29 and a photodiode, a feedback potentiometer 31 for detecting an actual position of the first air mix door, and a feedback potentiometer 32 for detecting an actual position of the second air mix door 16*a*, and calculates and produces an output signal which controls the opening angles and the positions of the internal/external air switching door 14, first and second air mix doors 15 and 16 (including 16*a* and 16*b*), floor door 17 and vent door 18 to the conditions appropriate to the operation environment of the air conditioner.

The microcomputer 100 further controls a speed of a blower through a blower driver 41, which may be a circuit shown in Japanese Patent Laid-Open Publication No. 104524/79. An input voltage to a differential amplifier which controls a base current of an output power transistor may be controlled by the output of the microcomputer 100.

The microcomputer 100 further controls energization of a magnet clutch 42 through a driver 50 to control operation of a compressor 43 and control flow of coolant flowing into the evaporator through an expansion valve 44.

The microcomputer 100 further produces a signal to control a hot water cock 46 arranged in a hot water path 45 through which hot water is supplied to the heater core 3, to control the hot water cock 46 through a driver 51.

In the present embodiments, the respective control elements are controlled in the following manners.

[Internal/external air switching door]

The opening angle of the internal/external air switching door is switched in accordance with an opening angle signal $\theta\mu$ of the first air mix door 15 obtained in the method to be described later, but the switching characteristic varies depending on an external air temperature condition. If the external air temperature is higher than a preset temperature set by the temperature setting potentiometer by more than 10° C., the internal-/external air switching door 14 is switched to the internal air introduction position S₁ when the opening angle signal of the first air mix door 15 is smaller than −11 degrees (the air mix door reaches the position P₁ when the opening angle signal is 0 degree and fixed at the position P₁ while the signal is in the negative range), and switched to the semi-internal/external air introduction position S₂ when the signal increases to −7 degrees. It is switched to the external air introduction position S₃ when the opening angle signal reaches +12 degrees. Once the door 14 is switched to the external air introduction position S₃, it is kept at the position S₃ until the opening angle signal of the first air mix door 15 is reduced below +4 degrees.

Under the external air condition other than those described above, the door 14 is not switched to the internal air introduction position S₁ whatever minus value the opening angle signal of the first air mix door 15 may assume. The switching to the semi-internal/external air introduction position and the external air introduction position is similar to the above.

[Air mix door]

Opening angles θ of the first and second air mix doors are calculated in the following manner. The calculation process is explained with reference to a block diagram of automatic control shown in FIG. 4 which shows a calculation process without correction according to this invention.

When the temperature $T_s$ is set by the temperature setting potentiometer 28, a corresponding voltage is read into the microcomputer 100. The microcomputer 100 subtracts a voltage corresponding to an external air temperature $T_a$ and a voltage corresponding to sunshine quantity $Z_c$ from the voltage corresponding to the preset temperature $T_s$ to determine an object temperature $T_{so}$. $K_s$, $K_a$ and $K_z$ are proportional constants used to convert the temperatures and the sunshine quantity to the voltages.

The object temperature for the upper portion of the compartment and the object temperature for the lower portion of the compartment are corrected such that there is a predetermined temperature difference therebetween depending on the external air temperature condition. In the present embodiment, both object temperatures are equal when the external air temperature is higher than 20° C., and when it is lower than 20° C., a correction value which increases as the external air temperature falls is added to the object temperature for the upper portion of the compartment. For example, when the preset temperature $T_s$ is 25° C. and the external air temperature is −10° C., the upper portion object temperature is 26.5° C. while the lower portion object temperature is 32° C.

The object temperature $T_{so}$ thus calculated is compared with the output of the internal air temperature sensors 26, 27 and a difference ΔT therebetween is calculated.

FIG. 4 shows a calculation process for ΔT, an upper half shows a calculation process when the chilled air is to be blown out to the upper portion of the compartment, and a lower half shows a calculation process when the chilled air is to be blown out to the lower portion of the compartment. Because both calculation processes are identical, only the calculation process when the chilled air is to be blown out to the upper portion of the compartment is explained.

The microcomputer calculates ΔT by proportional integration in accordance with the following equation to determine the object temperature $T_{do}$ of the air to be blown out of the vent blow-off port 11 (and the object temperature of the air to be blown out of the floor blow-off port).

$$T_{do} = K_p \left( \Delta T + \frac{1}{T_i} \int \Delta T_{dt} \right) \quad (1)$$

where $K_p$ is a proportional constant and $T_i$ is an integral constant. $P_i$ in FIG. 4 represents the proportional integration.

The microcomputer compares the object blow-off temperature $T_{do}$ with the actual blow-off temperature $T_d$ detected by the blow-off temperature sensors 24 and 25, and calculates the object opening angle $\theta_0$ of the air mix doors 15 and 16 based on the difference in accordance with the following equation.

$$\theta_0 = K_1 (T_{do} - T_d) \quad (2)$$

where $K_1$ is a proportional constant.

In practice, the air valves 20a and 21a are controlled in accordance with $\theta_0$ to control the air mix doors 12 and 15. The actual opening angle $\theta$ is detected by the feedback potentiometers 31 and 32 and it is corrected such that it is equal to the object opening angle $\theta_0$. $K_2$ represents a proportional constant.

As the air mix doors 15 and 16 are controlled to the desired opening angle, the blow-off temperature must reach $T_m$ which is essentially equal to the object temperature. However, the blow-off temperature varies with a take-in air temperature $T_{sc}$ of the air conditioner and the actual blow-off temperature is $T_d$. The actual temperature $T_d$ is compared with the object temperature $T_{do}$ and the opening angle of the air mix door is corrected in accordance with the equation (2).

When the temperature reaches the object temperature, the required cooling power $\theta_A$ is supplied into the compartment but the room temperature $T_r$ is higher than the object temperature $T_{so}$ by degrees corresponding to heat $Q_D$ coming into the compartment. $K_Q$ represents a constant for controlling the cooling power $Q_A$ in accordance with the blow-off temperature and is an element related to a flow rate of the chilled air, and R represents a thermal capacity element of the entire compartment.

Since the room temperature $T_r$ is higher than the object temperature $T_{so}$, the difference $\Delta T$ between the actual room temperature $T_r$ and the object temperature $T_{so}$ in accordance with the equation (1) by the proportional serves to correct the room temperature. $K_r$ represents a conversion constant when the room temperature is read into the microcomputer 100.

The proportional integration correction method using the concept of the present invention will now be explained.

In the present embodiment, the calculation formula of the proportional integration is corrected in accordance with the condition of the blow-off temperature $T_d$ to set a higher object blow-off temperature $T_{do}'$ so that the blow-off temperature does not become lower than the object temperature.

The difference $\Delta T$ between the object temperature $T_{so}$ and the room temperature $T_r$, which is used in the proportion term and the integral term of the proportional integration calculation, is classified to $\Delta T_1$ and $\Delta T_2$ as shown below.

$$T_{do} = K_p \left( \Delta T_1 + \frac{1}{T_i} \int \Delta T_2 dt \right) \quad (2')$$

$\Delta T_1$ and $\Delta T_2$ are defined as follows.

$$\Delta T_1 = T_{so} - T_r \quad (3)$$

$$\Delta T_2 = T_{so} - T_r \text{ if } T_d - (D_1 - D_2 \cdot Z_c) \geq 0 \quad (4)$$

$$T_{so} - T_r - \{T_d - (D_1 - D_2 \cdot Z_c)\} \text{ if } T_d - (D_1 - D_2 \cdot Z_c) < 0 \quad (5)$$

where $D_1$ is a predetermined lowest allowable temperature and $D_2$ represents a constant for correcting $D_1$. When the blow-off temperature $T_d$ is low, $\Delta T_2$ is set to be higher than $\Delta T_1$ to increase the affect by the integral term in the positive side so that the object blow-off temperature $T_{do}$ is set to the higher temperature $T_{do}'$.

In the present embodiment, if the sunshine quantity $Z_c$ is large even if the actual blow-off temperature is lower than the object temperature, the object blow-off temperature is set higher, because the lower blow-off temperature is rather comfortable to the occupants if the sunshine is strong. specifically, as shown by the equations (4) and (5), when the blow-off temperature $T_d$ and the sunshine correction term $(D_1 - D_2 \cdot Z_c)$ are equal or the difference therebetween is larger than zero, $\Delta T_2$ is set to be equal to $\Delta T_1$ because the sunshine is strong. On the other hand, when the difference between the blow-off temperature $T_d$ and the sunshine correction term is smaller than zero, an absolute value of the difference is added to $\Delta T_2$ and the sum is used in the integral term of the equation (2').

FIG. 5 shows a block diagram of the calculation process with correction in the present embodiment. FIG. 5 differs from FIG. 4 in that a block CR determines whether the integral term of the proportional integration is to be corrected or not based on the actual blow-off temperature $T_d$ and the sunshine quantity $Z_c$, and if it is to be corrected, sends a correction command to a block $P_i$. Otherwise, FIG. 5 is similar to FIG. 4. The determination of the correction of the integral term and the correction are performed in accordance with the equations (2') to (5). Other operations in FIG. 5 are similar to those of FIG. 4. If the conditions of the blow-off temperature $T_d$ and the sunshine quantity $Z_c$ are met, the microcomputer 100 controls the opening angles of the air mix doors 11 and 12 in accordance with the calculation process shown in FIG. 5 in the same manner as that shown in FIG. 4.

As a result, the term $$\frac{1}{T_i} \int \Delta T_2 dt$$

of the equation (2') increases with time and the object blow-off temperature $T_{do}$ rises. As a result, $\theta_0$ given by the equation (2) increases. The air mix doors 11 and 12 in FIG. 1 move increase $T_d$ and the blow-off temperature $T_d$ rises. This process continues until the condition $T_d - (D_1 - D_2 \cdot Z_c) > 0$ is met. The present embodiment belongs to the group of FIG. 1.

Figure 6:
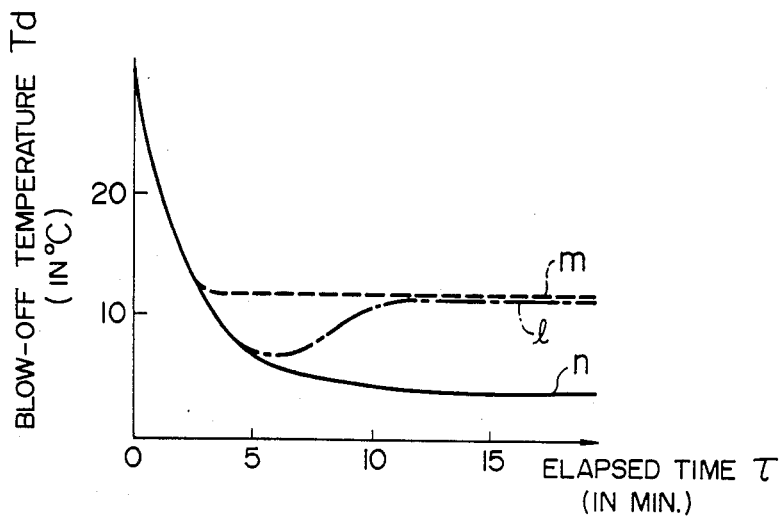
FIG. 6 shows a characteristic curve illustrating an advantage of the embodiment of the car air conditioner.

FIG. 6 shows a characteristic chart of the car air conditioner. A curve n shows a characteristic when the temperature control of the present invention is not effected, a curve l shows a characteristic when the temperature control of the present invention is effected, and a curve m shows a characteristic when a temperature control by another embodiment to be described later is effected.

As shown by a chain line curve l in FIG. 6, in accordance with the present embodiment, the blow-off air temperature $T_d$ rises to 10°–12° C. (when $D_1 = 12$ and $D_2 = 0 - 7/660$) in a steady state more than ten minutes after the start of cooling and it is very comfortable to the occupants. At a time five minutes after the start of cooling, the compartment temperature $T_r$ is not sufficiently low and $\Delta T_1$ in the equation (2') is large. Accordingly, the blow-off temperature $T_d$ is lower than 10° C. This allows quick initial cooling and does not cause the occupants to feel undercooling. Accordingly, the blow-off temperature response which satisfies the human being's feeling of comfort very well is obtained. If the sunshine directly applies to the occupants, the occupants feels hot unless the blow-off air temperature $T_d$ is lowered in accordance with the sunshine quantity $Z_c$. If $D_2 = 7/660$ in the equations (4) and (5), the blow-off air temperature $T_d$ in the steady state can be lowered to 5° C. under the mid-summer sunshine (typically 660 kcal/hr.m²) and the hot feeling of the occupant can be eliminated. It has been confirmed that the coolness of the blow-off air or pain is not felt by the occupant because the skin temperature of the occupant is high because of the sunshine.

When the blow-off temperature of the vent blow-off port 12 controlled by the first air mix door 5 and the blow-off temperature of the floor blow-off port 11 controlled by the second air mix door 16 are different, the object blow-off temperatures are calculated independently and the corrections of the integral terms by the blow-off temperatures are effected independently. Whether the floor blow-off temperature is low or high may be determined by the comparison with the sunshine quantity or the comparison with a predetermined value because the floor blow-off temperature is not significantly influenced by the sunshine. The vent blow-off temperature may also be determined by the comparison with a predetermined temperature instead of the decision by the presence or absence of the sunshine.

Another embodiment for preventing the blow-off of the chilled air from the blow-off port is explained.

Figure 7:
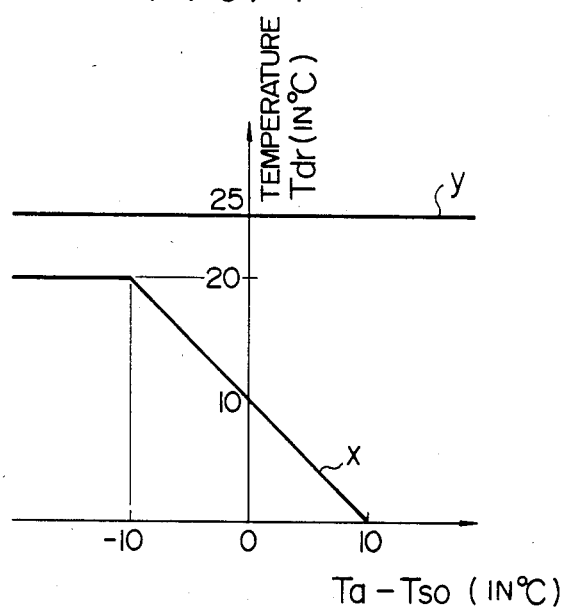
FIG. 7 shows a temperature condition characteristic curve for explaining other embodiment of the present invention.

A reference temperature $T_{dr}$ of the blow-off air temperature $T_d$ which human being feels cold or uncomfortable changes depending on the condition of the object temperature $T_{do}$ and the external or ambient air temperature $T_a$. An experimental data illustrating a relation therebetween is shown in FIG. 7. In FIG. 7, the reference temperature to the upper half of the body may be lower as the difference between the external air temperature $T_a$ and the object temperature $T_{so}$ increases, as shown by a solid line x. As explained before, when the sunshine applies to the occupant, the curve x of FIG. 7 is slid downward by a predetermined distance in accordance with the sunshine quantity $Z_c$ so that the reference temperature is further lowered. On the other hand, the reference temperature to the feet is little influenced by the external air temperature $T_a$ or the object temperature $T_{so}$ and not influenced by the sunshine quantity, as shown by a solid line y in FIG. 7.

Thus, in the present embodiment, when the object blow-off temperature $T_{do}$ calculated by the equation (1) is lower than the limit object temperature $T_{do\ min}$ calculated in accordance with an equation (6), the object blow-off temperature $T_{do}$ is substituted by $T_{do\ min}$, as shown in equations (6) to (8).

$$T_{do\ min} = T_{dr} - D_3 \cdot Z_c \quad (6)$$

where $D_3$ is a constant.

$$T_{do} = K_p\left(\Delta T + \frac{1}{T_i} \int \Delta T d\tau\right) \quad (7)$$

if $K_p\left(\Delta T + \frac{1}{T_i} \int \Delta T dt\right) \geq T_{do\ min}$ $$T_{do} = T_{do\ min} \quad (8)$$

if $K_p\left(\Delta T + \frac{1}{T_i} \int \Delta T dt\right) < T_{do\ min}$

In the present embodiment, since the object blow-off temperature $T_{do}$ does not fall below the minimum defined by the equation (6), the air mix door opening angle $\theta$ calculated by the equation (2) is large. The positions of the air mix doors 15 and 16 in FIG. 3 are limited to the range which allows the blow-off temperature higher than the temperature given by the equation (5). The time response of the blow-off temperature in the present embodiment is shown by the broken line curve m in FIG. 6. In FIG. 6, the position of the broken line m in the steady state is vertically slid by the predetermined distance in accordance with the external air temperature T, object temperature $T_{so}$ and sunshine quantity $Z_c$. The characteristic curve in FIG. 7 shows experimental values which present feeling of comfort. However, the characteristic curve may need certain amendment depending on the condition of the car. It has been experimentally determined that the appropriate value for $D_3$ is 10/660 for the upper half of the body and 0 for the feet. The present embodiment belongs to the group of FIG. 1. In the present embodiment, since the time element is not included in the calculation process of the object blow-off temperature $T_{do}$, the data analysis and the system modification are facilitated.

Figure 8:
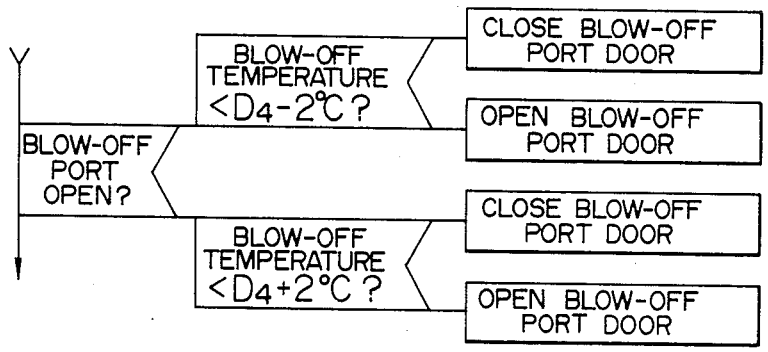
FIG. 8 is a flow chart for explaining a further embodiment.

Other embodiment of the present invention is explained with reference to FIG. 8. FIG. 8 is a problem analysis diagram (PAD) chart which shows a portion of a control logic. It differs from the previous embodiment in that the blow-off temperature $T_d$ is not raised but the flow of the chilled air is stopped. The basic operation of FIG. 8 is as follows. If the blow-off temperature $T_d$ is higher than a temperature $D_4$ at which human beings feel cold, the door at the blow-off port is opened to apply the air to the occupants, and if the blow-off temperature $T_d$ is below the temperature $D_4$, the door at the blow-off port is closed to stop the blow of the chilled air. In practice a hysteresis of ±2° C. is required to open and close the door in order to prevent the hunting due to small fluctuation of the temperature detected by the temperature sensor. FIG. 8 shows the logic which includes such a hysteresis. When the door at the blow-off port is open, the door is closed when the condition $T_d < D_4 - 2°$ C. is met, and when the door is closed, it is opened when the condition $T_d \leq D_4 + 2°$ C. is met. The present embodiment is particularly applicable to the floor blow-off temperature control in the air conditioner having the vent blow-off port 11 and the floor blow-off port 12 as shown in FIG. 3. In this case, appropriate value of $D_4$ is 22°–28° C. For example, at the start of cooling in a summer season, the blow-off air temperature is very high and the blow-off temperature $T_d$ is higher than $D_4$. Thus, the chilled air is blown out of the vent blow-off port 11 and the floor blow-off port 12 so that it is comfortable to the occupant who feels hot both in the upper half of the body and the feet. When the floor blow-off temperature falls below the temperature $D_4$ as the time passes, the floor door 17 is closed in accordance with the logic of FIG. 8 so that the blow of air to the feet is stopped. Under this condition, all air including the air which has heretofore been blown to the feet is blown out of the vent blow-off port 11 so that the chilled air is applied to the upper portion of the occupant's body. The air which gains weight by cooling goes down toward the feet so that the occupant feels cold in the feet. The blow-off temperature sensor 25 at the floor blow-off port 12 is also cooled so that the hunting does not occur in opening or closing the floor door 17 in accordance with the logic of FIG. 8. Thus, very comfortable and stable control effect is obtained. By using the blow-off temperature control in the first and second embodiments to control the blow-off temperature of the vent blow-off port, more effective air condition effect is obtained. The present embodiment belongs to the group of FIG. 1.

In the above embodiments, the opening angle of the air mix door is calculated by the microcomputer. The present invention is not limited to such embodiments but it may be applied to that having a proportional integration operational amplifier as shown in Japanese Patent Laid-Open Publication No. 31654/80. This embodiment belongs to the group of FIG. 2. The embodiments of the group of FIG. 2 will now be explained.

When the proportional integration operational amplifier is used to perform the temperature control similar to that of the first embodiment, switching means is provided to apply to the input to the integration operational amplifier the value determined by the equation (4) or the value determined by the equation (5) depending on the condition of the blow-off temperature $T_d$ and the sunshine quantity $Z_c$.

If the temperature control similar to that of the second embodiment is to be performed, output limit means for limiting the output of the proportional integration operational amplifier to a value below which the blow-off temperature falls below the predetermined temperature, for example, means for clamping a base potential of an output transistor is provided.

In a system which independently controls the vent blow-off temperature and the floor blow-off temperature as shown in FIG. 1, control output circuits for the air mix doors are constructed by the proportional integration operational amplifiers and the chilled air blow-off prevention means are provided for the respective circuits.

The control to close the floor blow-out port may be effected by opening and closing the floor door in accordance with the output of the operational amplifier by using the air value and the actuator.

When the microcomputer is used, the chilled air blow-off prevention means may be constructed by external circuits 52 and 53 as shown by broken lines in FIG. 3 and the microcomputer determines the condition of the blow-off temperature and the sunshine quantity to determine whether the external circuits 52 and 53 are to be operated or not. The external circuits 52 and 53 may be constructed to inhibit the normal control signal supplied from the microcomputer 100 for the air valves 21a and 20a and produces by itself a control signal to prevent the blow-off temperature in the first and second embodiments from falling below the predetermined temperature.

The external circuit 52 may be constructed to produce a control signal which causes the air valve 22a to close in spite of the control output from the microcomputer 100 which controls the floor door.

The third embodiment described above may be used to forcibly close the vent door to blow-out the chilled air to the defroster port 6.

[Compressor]

The compressor 43 is operated or stopped by controlling the magnet clutch 42 by the controller 50 in response to the output from the microcomputer 100 so that the compressor is operated when the external air temperature is higher than 0° C. and stopped when the temperature is not higher than 0° C. When an economic operation in which the air conditioner stops to operate the compressor and takes in the external air to condition the air is requested, the controller 50 stops the compressor in spite of the output from the microcomputer.

[Blower]

The flow rate of the blower 3 is determined by the difference between the object temperature $T_{so}$ and the actual room temperature $T_r$. The signal representative of the difference, supplied from the microcomputer is converted to a voltage and the flow rate is linearly controlled between the minimum and maximum in accordance with a well-known V characteristic.

The maximum flow rate is set to a value determined by an applied voltage of 9 volts when the difference between the external air temperature $T_a$ and the object temperature $T_{so}$ is zero, and it is increased up to a value corresponding to 12 volts as the difference increases either positively or negatively. The rate of change of the flow rate in the negative region is smaller than that in the positive region.

[Hot water cock]

The hot water cock 46 is controlled by the output of the microcomputer 100 through the controller 51 so that it is opened when the external air temperature $T_a$ is lower than the target temperature $T_{so}$. Under other conditions, the hot water cock 46 is opened when the opening angle signal $\theta_o$ of the first air mix door 11 exceeds 1 degree, and once it is opened, it is kept opened until the opening angle signal $\theta_o$ decreases below $-1$ degree, when it is closed.

We claim:

1. An air conditioning method for controlling a temperature in a room by an air conditioner for controlling a temperature control element in accordance with a required cooling power in the room, comprising steps of:
    directly or indirectly monitoring a temperature of chilled air blown out of a chilled air blow-off port of the air conditioner; and
    suppressing the temperature of the chilled air blown out of the blow-off port from dropping below a temperature variably set in dependance upon an external air temperature and a sunshine quantity, when the chilled air temperature is lower than the set temperature, irrespective of the temperature control in accordance with the required cooling power in the room.

2. An air conditioning method
    for controlling a temperature in a room by an air conditioner for controlling a temperature control element in accordance with a required cooling power in the room, comprising steps of:
    directly or indirectly monitoring a temperature of chilled air blown out of a chilled air blow-off port of the air conditioner; and
    suppressing the temperature of the chilled air blown out of the blow-off port from dropping below a predetermined temperature, when the chilled air temperature is lower than a predetermined temperature, irrespective of the temperature control in accordance with the required cooling power in the room;

wherein the temperature control in accordance with the required cooling power in the room is carried out by making proportional integration operation of a difference between a preset temperature and the room temperature and controlling the temperature of the blow-off chilled air in accordance with the operation result to regulate a supply cooling force, and the suppression of the blow-off of the chilled air includes a step of adding a correction to an integral term of the proportional integration operation when the blow-off chilled air temperature is lower than the predetermined temperature such that the chilled air temperature is raised more as the blow-off temperature falls.

3. An air conditioning method according to claim 2 wherein the suppression of the blow-off of the chilled air depends on the presence or absence of sunshine, and said predetermined temperature is higher when the sunshine is absent than when the sunshine is present.

4. An air conditioning method
for controlling a temperature in a room by an air conditioner for controlling a temperature control element in accordance with a required cooling power in the room, comprising steps of:
directly or indirectly monitoring a temperature of chilled air blown out of a chilled air blow-off port of the air conditioner; and
suppressing the temperature of the chilled air blown out of the blow-off port from dropping below a predetermined temperature, when the chilled air temperature is lower than a predetermined temperature, irrespective of the temperature control in accordance with the required cooling power in the room;

wherein the temperature control in accordance with the required cooling power in the room is carried out by making proportional integration operation of a difference between a preset temperature and the room temperature and controlling the blow-off chilled air temperature in accordance with the operation result to regulate a supply cooling power, and the suppression of the blow-off of the chilled air includes a step of using a value corresponding to the predetermined chilled air temperature instead of the operation result to control the blow-off chilled air temperature when the operation result of the proportional integration operation requires that the blow-off chilled air temperature should be lower than the predetermined temperature.

5. An air conditioning method according to claim 4 wherein the suppression of the blow-off of the chilled air depends on the presence or absence of sunshine, and said predetermined temperature higher when the sunshine is absent than when the sunshine is present.

6. A temperature control apparatus in an air conditioner having means for generating a control signal in accordance with a required cooling force in a room and at least one temperature control element for controlling a room temperature in accordance with said control signal, comprising:
blow-off chilled air temperature detection means for directly or indirectly detecting a temperature of chilled air blown out of said air conditioner to the room;
compare means for comparing the chilled air temperature detected by said detection means with a temperature variably set in dependence upon an external air temperature and a sunshine quantity and producing an output when the chilled air temperature is lower than the set temperature; and
chilled air blow-out suppression means for suppressing the blow-off of the chilled air colder than the set temperature in response to the output from said compare means.

7. A temperature control apparatus according to claim 6, wherein said chilled air blow-out suppression means enables said chilled air temperature to be lower than said set temperature for a period of time from the start of cooling until a steady state is reached in dependence upon an amount of difference between said room temperature and said set temperature.

* * * * *